(12) United States Patent
Aigner

(10) Patent No.: US 9,867,474 B2
(45) Date of Patent: Jan. 16, 2018

(54) SEATING FURNITURE

(71) Applicant: HIMOLLA POLSTERMOEBEL GMBH, Taufkirchen/Vils (DE)

(72) Inventor: Johann Aigner, Taufkirchen/Vils (DE)

(73) Assignee: HIMOLLA POLSTERMOEBEL GMBH, Taufkirchen/Vils (DE)

( * ) Notice: Subject to any disclaimer, the term of this patent is extended or adjusted under 35 U.S.C. 154(b) by 88 days.

(21) Appl. No.: 14/993,111

(22) Filed: Jan. 12, 2016

(65) Prior Publication Data

US 2016/0242555 A1 Aug. 25, 2016

(30) Foreign Application Priority Data

Jan. 15, 2015 (DE) .................. 10 2015 100 598

(51) Int. Cl.
| | |
|---|---|
| *A47C 17/165* | (2006.01) |
| *B60N 2/20* | (2006.01) |
| *A47C 17/16* | (2006.01) |
| *A47C 7/40* | (2006.01) |

(52) U.S. Cl.
CPC ............ *A47C 17/161* (2013.01); *A47C 7/407* (2013.01); *A47C 17/165* (2013.01); *B60N 2/206* (2013.01)

(58) Field of Classification Search
None
See application file for complete search history.

(56) References Cited

U.S. PATENT DOCUMENTS

| | | | | |
|---|---|---|---|---|
| 2,240,748 | A * | 5/1941 | Bak | A47C 17/165 |
| | | | | 105/315 |
| 2,942,649 | A * | 6/1960 | Wells | A47C 7/70 |
| | | | | 297/125 |
| 5,104,182 | A * | 4/1992 | Rasnick | A47C 7/62 |
| | | | | 297/113 |
| 5,524,959 | A * | 6/1996 | Scott | A47C 7/68 |
| | | | | 297/125 |
| 7,137,663 | B2 * | 11/2006 | Tsujibayashi | B60N 2/01583 |
| | | | | 296/65.03 |

(Continued)

FOREIGN PATENT DOCUMENTS

| | | |
|---|---|---|
| DE | 298 00 428 U1 | 5/1999 |
| DE | 20 2011 051 245 U1 | 11/2011 |
| DE | 20 2011 106 248 U1 | 11/2011 |
| DE | 10 2012 218 156 A1 | 4/2014 |

*Primary Examiner* — Joshua J Michener
*Assistant Examiner* — Kyle J. Walraed-Sullivan
(74) *Attorney, Agent, or Firm* — Norman B. Thot

(57) ABSTRACT

Seating furniture includes seating units arranged next to each other. A first seating unit includes a first seating unit seat part and a first seating unit back part. The second seating unit includes a second seating unit seat part, a second seating unit back part which is adjustable relative to the second seating unit seat part between a sitting position and a storage position, and an adjusting mechanism. The second seating unit back part includes a rear side which forms a storage surface, a first storage plate, and a second storage plate. The first storage plate and the second storage plate together form the storage surface in the storage position. The adjusting mechanism moves the first storage plate and the second storage plate relative to each other between the sitting position and the storage position. The adjusting mechanism is active when the second seating unit back part is adjusted.

19 Claims, 5 Drawing Sheets

(56) References Cited

U.S. PATENT DOCUMENTS

| | | | | |
|---|---|---|---|---|
| 7,959,230 B2* | 6/2011 | Hentges | ............... | B60N 2/0232 297/378.12 |
| 2004/0056500 A1* | 3/2004 | Kayumi | ................... | B60N 2/01 296/37.15 |
| 2004/0070243 A1* | 4/2004 | Cha | ........................ | B60N 2/206 297/232 |
| 2004/0099186 A1* | 5/2004 | Wojcik | ................... | B60N 2/206 108/44 |
| 2005/0231008 A1* | 10/2005 | Jaaska, Sr. | ........... | B60N 2/4686 297/188.2 |
| 2007/0013204 A1* | 1/2007 | Yajima | ............... | B60N 2/01583 296/65.03 |
| 2007/0138847 A1* | 6/2007 | Gundall | ................ | B60N 2/206 297/216.1 |
| 2007/0216185 A1* | 9/2007 | McMillen | ............... | B60N 2/206 296/64 |
| 2011/0074199 A1* | 3/2011 | Sprenger | ................ | B60N 2/206 297/361.1 |
| 2015/0097406 A1* | 4/2015 | Tanaka | ................. | B60N 2/5816 297/378.1 |
| 2015/0175040 A1* | 6/2015 | Meszaros | ............... | B60N 2/305 297/188.01 |
| 2016/0183688 A1* | 6/2016 | Thurow | ...................... | A47C 17/165 5/13 |
| 2016/0242560 A1* | 8/2016 | Aigner | ................... | A47C 7/407 |
| 2016/0374469 A1* | 12/2016 | Ham | ........................ | A47C 1/12 297/248 |

* cited by examiner

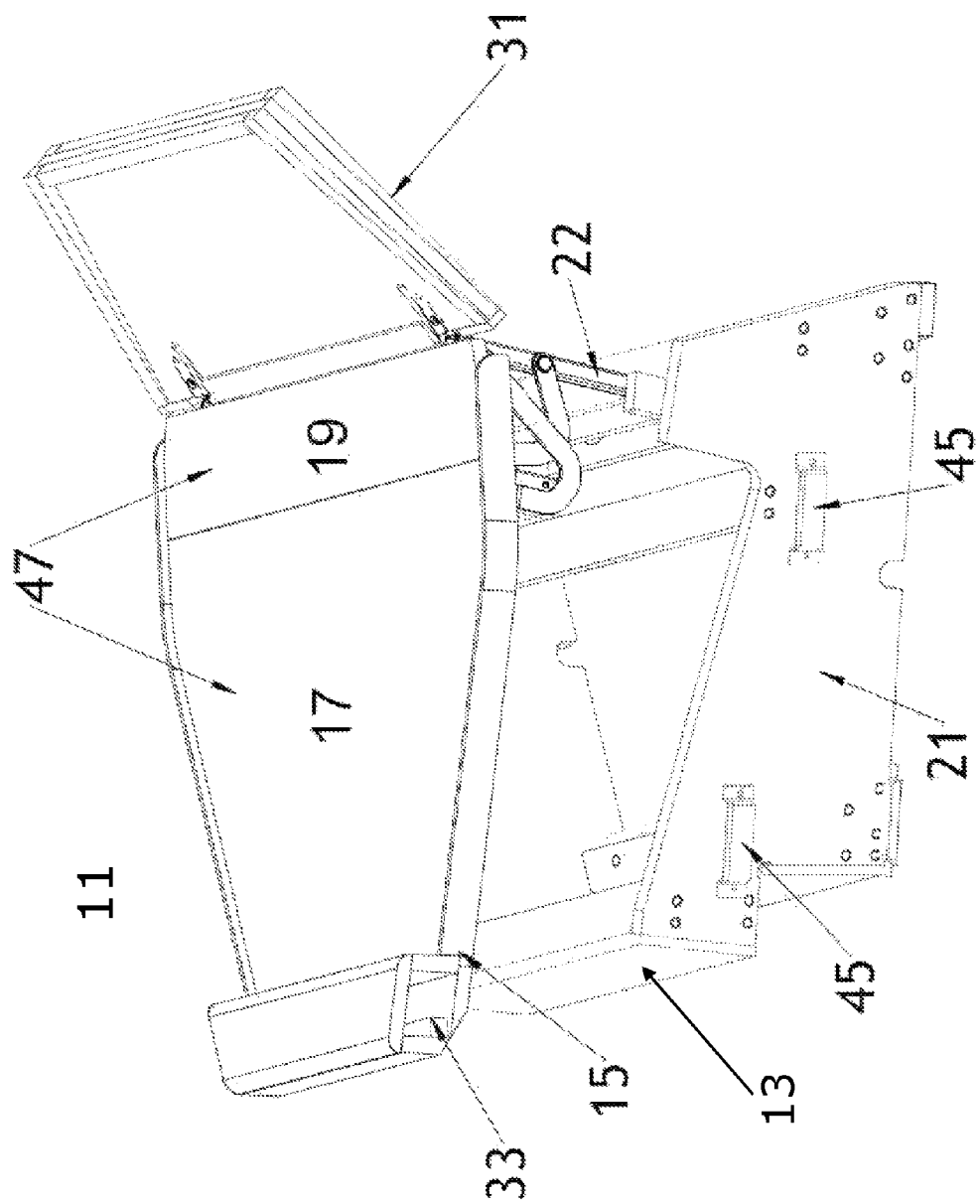

SEATING FURNITURE

CROSS REFERENCE TO PRIOR APPLICATIONS

Priority is claimed to German Patent Application No. DE 10 2015 100 598.0, filed Jan. 15, 2015. The entire disclosure of said application is incorporated by reference herein.

FIELD

The present invention relates to an item of seating furniture, in particular to a sofa, comprising at least two, for example, three, seating units which are arranged next to one another with, in each case, one seat part and one back part, wherein, on at least one of the seating units, the back part is adjustable relative to the seat part between a sitting position and a storage position in which the rear side of the back part forms a storage surface.

BACKGROUND

Seating furniture of this type has generally previously been described, for example, in DE 10 2012 218 156 A1 and in DE 20 2011 051 245 U1.

It is generally desirable to further improve handling when adjusting the back part and to optimize the space requirement in the storage position.

SUMMARY

An aspect of the present invention is to provide an item of seating furniture as described above which fulfills the aforementioned requirements.

In an embodiment, the present invention provides an item of seating furniture which includes at least a first seating unit and a second seating unit arranged next to each other. The first seating unit comprises a first seating unit seat part and a first seating unit back part. The second seating unit comprises a second seating unit seat part, a second seating unit back part, and an adjusting mechanism. The second seating unit back part is configured to be adjustable relative to the second seating unit seat part between a sitting position and a storage position. The second seating unit back part comprises a rear side which is configured to form a storage surface, a first storage plate, and a second storage plate. The first storage plate and the second storage plate together form the storage surface in the storage position. The adjusting mechanism is configured to move the first storage plate and the second storage plate relative to each other between the sitting position and the storage position. The adjusting mechanism is active when the second seating unit back part is adjusted.

BRIEF DESCRIPTION OF THE DRAWINGS

The present invention is described in greater detail below on the basis of embodiments and of the drawings in which:

FIG. 5 shows a perspective view of an exemplary embodiment of an item of seating furniture according to the present invention in the storage position.

DETAILED DESCRIPTION

Figure 1:
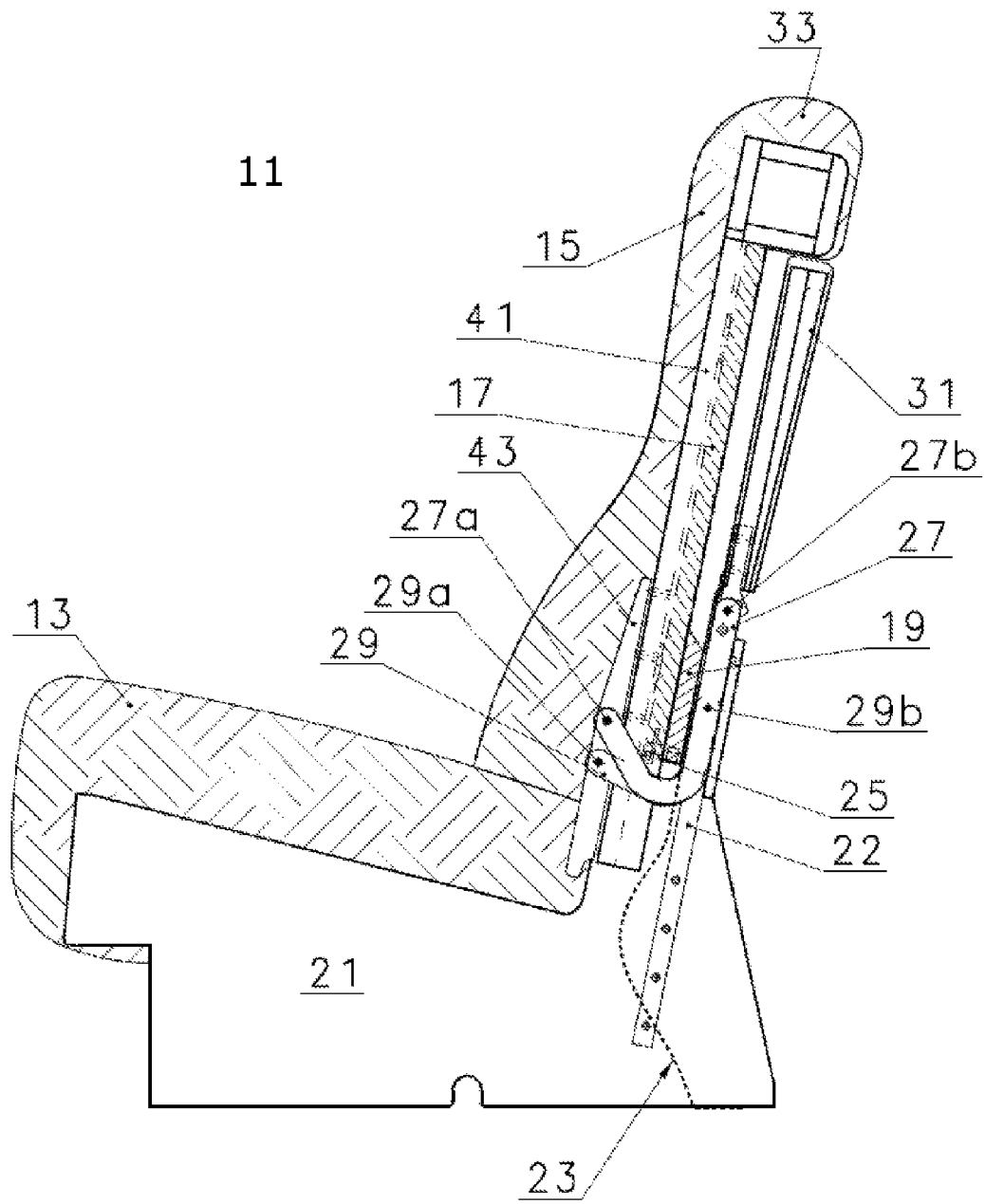
FIG. 1 shows an exemplary embodiment of an item of seating furniture according to the present invention in the sitting position.

In an embodiment, the present invention provides that the back part includes at least two storage plates which together form the storage surface in the storage position and for which an adjusting mechanism moves, for example, pivots, the storage plates relative to one another between the sitting position and the storage position, the adjusting mechanism being active when the back part is adjusted.

The adjusting mechanism provides that when the back part is adjusted, the storage plates are moved relative to one another so that, in the storage position, the two plates together form the storage surface. Additional actuating operations by the user are not necessary. All that is necessary to achieve the storage position is to move the back part out of the sitting position into the storage position.

In an embodiment of the present invention, the storage plates can, for example, be movable, in particular pivotable, in opposite directions. The storage plates can, for example, be pivotally connected to one another.

In an embodiment of the present invention, a first storage plate can, for example, be trapezoidal, and a second storage plate can, for example, be rectangular.

In an embodiment of the present invention, the depth of a first storage plate can, for example, be approximately between two and seven times the depth of a second storage plate, for example, between three and five times.

In an embodiment of the present invention, a first storage plate can, for example, always be oriented parallel to the rear side of the back part or can, for example, be formed by at least part of the rear side of the back part itself.

When adjusting the back part into the storage position, a region of the back part that is at the bottom in the sitting position can, for example, be raised. It can thereby be provided that the rear side of the back part is located in the storage position at a level which provides a comfortable storage possibility for a user sitting on an adjacent seat part. The raising of the back part or the adjusting device provided for this purpose can also be utilized by the adjusting mechanism which moves the storage plates or can form a component part of the adjusting mechanism.

In an embodiment of the present invention, an adjusting movement of a second storage plate can, for example, be controllable in common via the back part and via a retaining device which is anchored to a base. The adjusting of the back part is thereby utilized to move the second storage plate, whereby the adjusting of the back part alone does not provide that the second storage plate passes into the storage position. The retaining device, which is anchored on the base and which controls the movement of the second storage plate in the desired manner together with the back part, is additionally provided for this purpose.

The base of the seating furniture can, for example, be the body/corpus as the essential carrying element of the seating furniture. This is not, however, compulsory. Separate parts or components which are fixedly connected to the body are also applicable within the framework of this disclosure as the base of the seating furniture or as component parts of the base.

In an embodiment of the present invention, the retaining device, which is anchored on the base, can act so that the second storage plate pivots about a pivot region which is movable together with the back part, and the retaining device cooperates with the second storage plate at a spacing from the pivot region. The movement of the back part, e.g., the previously-mentioned lifting movement of a region of the back part that is at the bottom in the sitting position, and the retaining device interact to pivot the second storage plate. The second storage plate is thereby pivoted, for example, out of a swiveled-in or folded-in position so that, when reaching the storage position, it is aligned with the first storage plate and the two storage plates together form the storage surface.

The retaining device can be length-adjustable against a resetting force. The retaining device is in particular an elastic band or an elastic strap. This simplifies the construction of the seating furniture as the retaining device must not have a precise length determination in order to be able to move the second storage plate into the storage position. With a retaining device of this type, when producing the storage position, the second storage plate can in particular be reliably pulled against a stop which defines the storage position of the second storage plate and provides a precise alignment of the second storage plate with respect to the first storage plate.

In an embodiment of the present invention, it is provided that the back part can, for example, be pivotally connected to a base by a fitting. The base can be the body or a separate component of the seating furniture which is fixedly connected to the body. The fitting can in particular be a lift-fold fitting which not only enables the back part to pivot about an axis, but also raises the back part to a predefined level during adjustment.

The fitting which connects the back part to the base can include a four-joint lever. Forced control of the back part, which is advantageous for the user and provides an optimum sequence of movement of the back part and consequently provides a simple and reliable operation for the user, can be realized during adjustment in this manner.

The fitting can include two articulated levers which are in particular angled once or repeatedly and which are pivotally mounted on the back part and on the base, in each case, on rotational axes which are spaced apart from one another. It can thereby be provided that, in the sitting position, the rotational axes of the back part are located in a plane which extends at least substantially parallel to a plane in which the rotational axes of the base are located. In the storage position, the rotational axes of the back part can, for example, be located in a plane which extends at least substantially horizontally.

In an embodiment of the present invention, a rear wall can, for example, be provided which is arranged behind the back part, wherein the rear wall in particular conceals the storage plates at least in part in the sitting position. The seating furniture according to the present invention can thereby be utilized in a free-standing arrangement, i.e., not on a wall, without the storage plates or parts of the adjusting mechanism being visible in an intrusive manner.

Such seating furniture provides a challenge to designers by continually placing high demands on the design, and because the two functions of "sitting" and "providing a storage surface" must be considered structurally. The storage surface must not be too small. At the same time, the back part must not appear too "weighty" as it must provide the user with the usual leaning facility in the sitting position and must additionally match the back part of the adjacent seat unit or seat units. Sufficient space must also be available for the adjustment movement of the back part. This space competes with the space available for accommodating the storage plates. To this is added the abovementioned rear wall, which in many cases is not to be omitted.

In an embodiment of the present invention, in the storage position, a gap, which is present between a first storage plate and the rear wall, is at least substantially closed or bridged by a second storage plate. The second storage plate can therefore be utilized to close or bridge the gap, while the second storage plate at the same time enlarges the storage surface provided by the first storage plate. The creation of the gap can be conditional on adjusting the back part into the storage position. For example, it can thus be necessary for the rear wall to be moved out of a, for example, substantially upright sitting position, e.g., by pivoting rearward, either prior to adjusting the back part or together with the adjustment of the back part. A gap which is thereby created between the rear wall and the back part can be closed or bridged by the second storage plate.

According to the present invention, it is possible but not compulsory for the rear wall to be adjustable, for example, pivotable, between a sitting position and a storage position.

In the storage position, the rear wall can protrude upward beyond the plane defined by the storage surface. The rear wall in particular tilts rearward in the storage position.

The present invention does not require for the rear wall to be shifted completely rearward and assume an at least substantially horizontal position. This minimizes the space required for the seating furniture according to the present invention in the region behind the seating furniture. It is consequently possible to position the seating furniture according to the present invention relatively close to a wall and to nevertheless provide a comparatively large storage surface.

The concept of a rear wall that is pivotable to the rear, of a back part that is pivotable to the front with a first storage plate, of permitting a gap between the rear wall and back part to be created in connection therewith, and of providing a second storage plate which is moved in a suitable manner by an adjusting mechanism in order to close or to bridge the gap created and to contribute to the storage surface, enables a simple control with a large storage surface and a small space requirement behind the seating furniture. It is in particular possible for the rear side of the adjustable back part to extend comparatively far down and to consequently be able to be provided with a correspondingly large storage plate.

The rear wall can be pivotally connected to a base of the seating furniture.

In an embodiment of the present invention, the rear wall can, for example, be pivotable about an axis which coincides with a rotational axis of a fitting, via which the back part is pivotally connected to a base. The construction of the seating furniture can thereby be further simplified.

In an embodiment of the present invention, the storage plates can, for example, be hinged together or folded together in the sitting position. It can in particular be provided that the storage plates abut flatly against one another in the sitting position. It can, for example, be provided that the storage plates form a substantially level storage surface in the storage position and in particular connect to one another in a flush manner.

In an embodiment of the present invention, it can, for example, be advantageous when the storage plates are at least substantially completely concealed in the sitting position.

The back part can carry a head part which conceals the storage plates at least in part in the sitting position. The head part can be arranged so as to be adjustable relative to the back part or fixed.

The head part can form the upper closure of a recessed region serving as a receiving space on the rear side of the back part, the receiving space serving for the purpose of receiving the storage plates and, where applicable, a rear wall so that, in the sitting position, the rear side of the rear wall and the rear side of the head part are located at least substantially in one plane. A visually appealing rear side of the seating furniture is provided as a result in the sitting position.

An embodiment of the present invention is described below under reference to the drawings.

Figure 2:
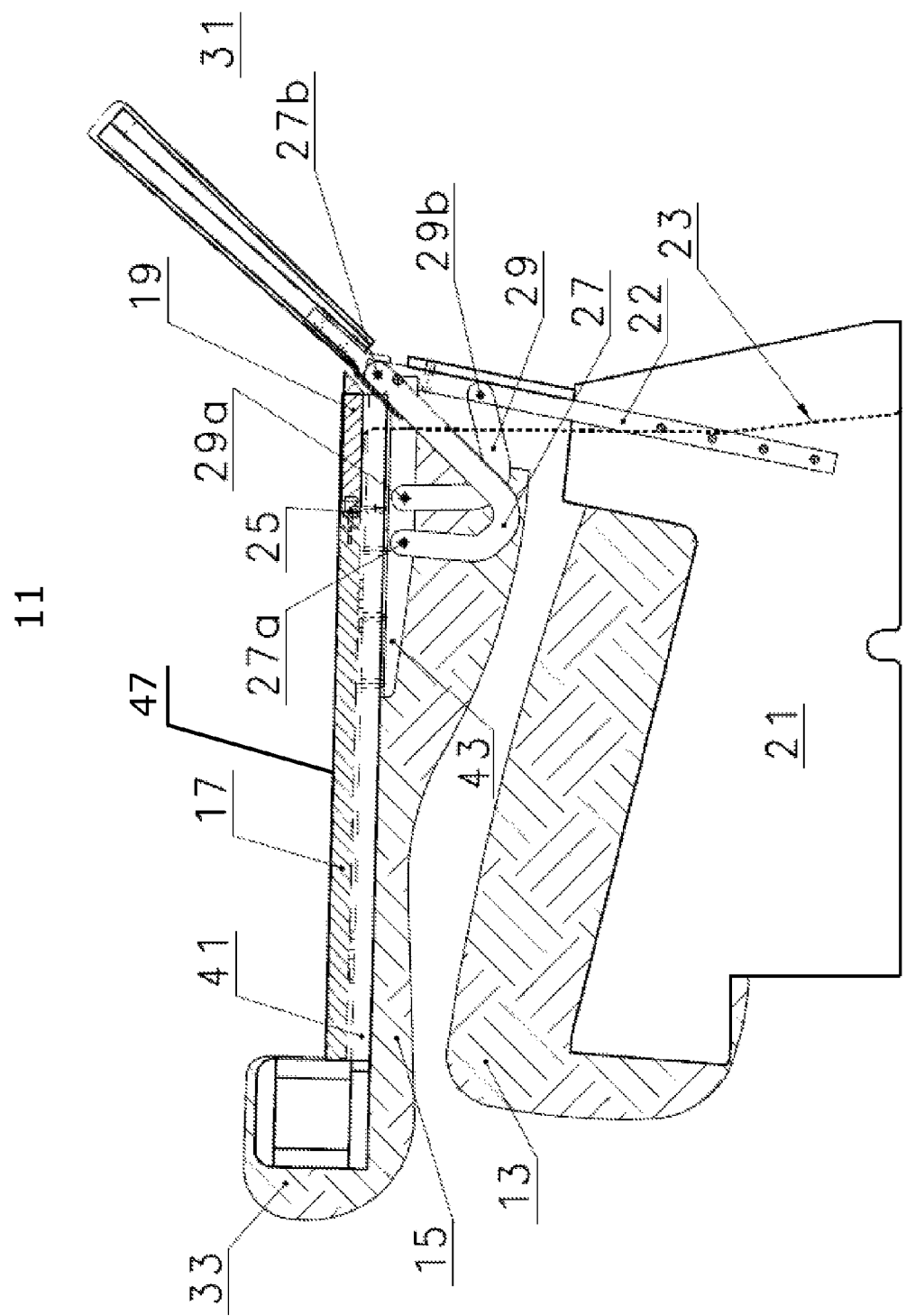
FIG. 2 shows an exemplary embodiment of an item of seating furniture according to the present invention in the in the storage position.

FIGS. 1 and 2 show in each case a sectional view of one seating unit which is a component part of a multiple seating unit, for example, a two-seater or three-seater sofa, with several seating units arranged next to one another. For example, the seating unit 11 shown is the central part of a three-seater where a back part 15, which serves as a backrest for a user, is able to be hinged forward in the manner described in more detail below to provide a storage surface 47 which is accessible to persons sitting on both side parts of the three-seater, for example, for putting down drinks.

In the case of the seating unit 11 shown, a body 21 carries a padded seat part 13 as well as a carrier 22 which is fixedly connected to the body 21 and on which, via a fitting 27, 29, which will be explained below, an adjustable back part 15 and an adjustable rear wall 31 are supported.

The back part 15 is closed off at the top end by a head part 33 which protrudes to the rear. In the sitting position according to FIG. 1, the receiving space created as a result on the rear side of the back part 15 receives two storage plates 17, 19, more details of which will be given below, as well as the already mentioned rear wall 31. The rear side of the rear wall 31 and the rearward surface of the head part 33 are located approximately in one plane in the sitting position.

On account of the rear wall 31, the rearward region of the back part 15 below the head part 33 cannot be seen from the outside. The components provided in the region below the head part 31, in particular, the two articulated levers 27, 29 which form the fitting, do not protrude rearward in any configuration of the seating unit according to the present invention. These can therefore be permanently concealed, for example, by padding, a covering, or a panel, so that this region of the seating unit 11 also cannot be seen from the outside.

The back part 15 is provided with a carrier plate 41 on which a carrier 43 is fastened in a bottom region on its front side. On its rear side, the carrier plate 41 is provided with a first storage plate 17 which provides the larger part of the storage surface 47 in the storage position according to FIG. 2.

The two articulated levers 27, 29 are pivotally connected to the carrier 43 at positions which are at spacings lengthwise of the carrier 43, on parallel rotational axes 27a and 29a.

The two articulated levers 27, 29 are angled or curved, the two portions of the first articulated lever 27 enclosing an angle of less than 90° and being of different lengths, whereas in the case of the second articulated lever 29, the two portions are approximately the same in length and enclose an angle of 90°.

With their other ends, the articulated levers 27, 29 are connected in an articulated manner to the carrier 22, which is fastened to the body 21. The two rotational axes 27b and 29b which are defined as a result are consequently stationary with reference to the seating furniture.

As a result of the form, the length, and the positioning of the rotational axes of such a double-joint or four-joint lever, it is possible to define in a specific manner the start position, end position, and the sequence of movement of the components which are here formed by the back part 15 and are to be adjusted.

In the sitting position according to FIG. 1, the back part 15 as a whole, the carrier plate 41, the first storage plate 17, the rear wall 31, a plane which includes the two rotational axes 27a, 29a located on the back part 15, as well as a plane which includes the two stationary rotational axes 27b, 29b are located approximately in planes which extend parallel to one another and are tilted slightly rearward with reference to the vertical.

A second storage plate 19, the depth of which in this embodiment is approximately a quarter of the depth of the first storage plate 17, is pivotally connected to the first storage plate 17, for example, by a hinge, as a result of which a pivot region 25 is defined.

In the sitting position according to FIG. 1, the storage plates 17, 19 are hinged together or folded together so that they abut flatly against one another. The second storage plate 19 is connected to the body 21 by an elastic strap 23, which is indicated as a dot-dash line, and which can transmit only tensile forces and serves as a retaining device 23 for moving the second storage plate 19 when the storage position according to FIG. 2 is produced.

The second storage plate 19 is not directly connected to the articulated levers 27, 29. Provided are only the already mentioned, articulated connection between the second storage plate 19 and the first storage plate 17 and, at a position at a spacing from the pivot region 25 (compare in particular FIG. 2), the connection between the elastic strap 23 which forms the retaining device 23 and the second storage plate 19.

The rear wall 31 is pivotably mounted on the stationary carrier 22 to pivot about the rotational axis 27b about which the first articulated lever 27 of the fitting, which couples the back part 15 to the basis formed by the body 21 and the carrier 22, is pivotable. The rear wall 31 is in this case forcibly coupled with the first articulated lever 27 so that the rear wall 31 is only able to be hinged together with the first articulated lever 27, whereby at any time the rear wall 31 and the longer portion of the first articulated lever 27, which is pivotally mounted on the carrier 22, are located approximately in a common plane.

When, proceeding from the sitting position according to FIG. 1, the back part 15 is manually hinged down toward the front by a user and is consequently pivoted into the storage position according to FIG. 2, the region of the back part 15 that is at the bottom in the sitting position is raised due to the sequence of movement of the back part 15 which is predefined by the two articulated levers 27, 29. In the storage position according to FIG. 2, the padded front side of the back part 15 is at a spacing from the padding of the seat part 13 at any position, whereby the first storage plate 17, which now forms the largest part of the storage surface 47 with its rear side, is oriented horizontally.

When the back part 15 is adjusted into the storage position, the rear wall 31 is tilted rearward about the rotational axis 27b. In the storage position according to FIG. 2, the rear wall 31 encloses, for example, an angle of 45° with the vertical. A gap which is present in this storage position according to FIG. 2 between the bottom or rear end of the first storage plate 17 and the front side of the rear wall 31 is closed or bridged by the second storage plate 19. In the storage position according to FIG. 2, the second storage plate 19 is located in a common plane with the first storage plate 17, the two storage plates 17, 19 connecting to one another in a flush manner and forming a continuous level storage surface.

The adjusting mechanism, which includes the two articulated levers 27, 29, the connection between the second storage plate 19 and the first storage plate 17, and the elastic strap 23 serving as the retaining device 23, provides that the second storage plate 19 also reaches the storage position shown in FIG. 2. When the back part 15 is adjusted, the end of the second storage plate 19, which is pivotally connected to the first storage plate 17, is raised and moved forward. In this case, the elastic strap 23, which cooperates with the second storage plate 19 at a spacing from the pivot region 25, holds back the second storage plate 19. This results in (when viewed from the back part 15 or the first storage plate 17) the second storage plate 19 being pivoted downward about the pivot region 25 by the elastic strap 23 until the second storage plate 29 abuts against the carrier plate 41, whereupon the second storage plate 19 is aligned parallel to the first storage plate 17.

In other words, the retaining device 23 provides that the two storage plates 17, 19 are unfolded or hinged out in a reliable manner when the back part 15 is pivoted into the storage position according to FIG. 2.

FIG. 2 also shows that the second storage plate 19 is beveled at its bottom or rear end corresponding to the inclination of the rear wall 31 in the storage position in order to completely close or bridge the gap between the first storage plate 17 and the rear wall 31.

Figure 3:
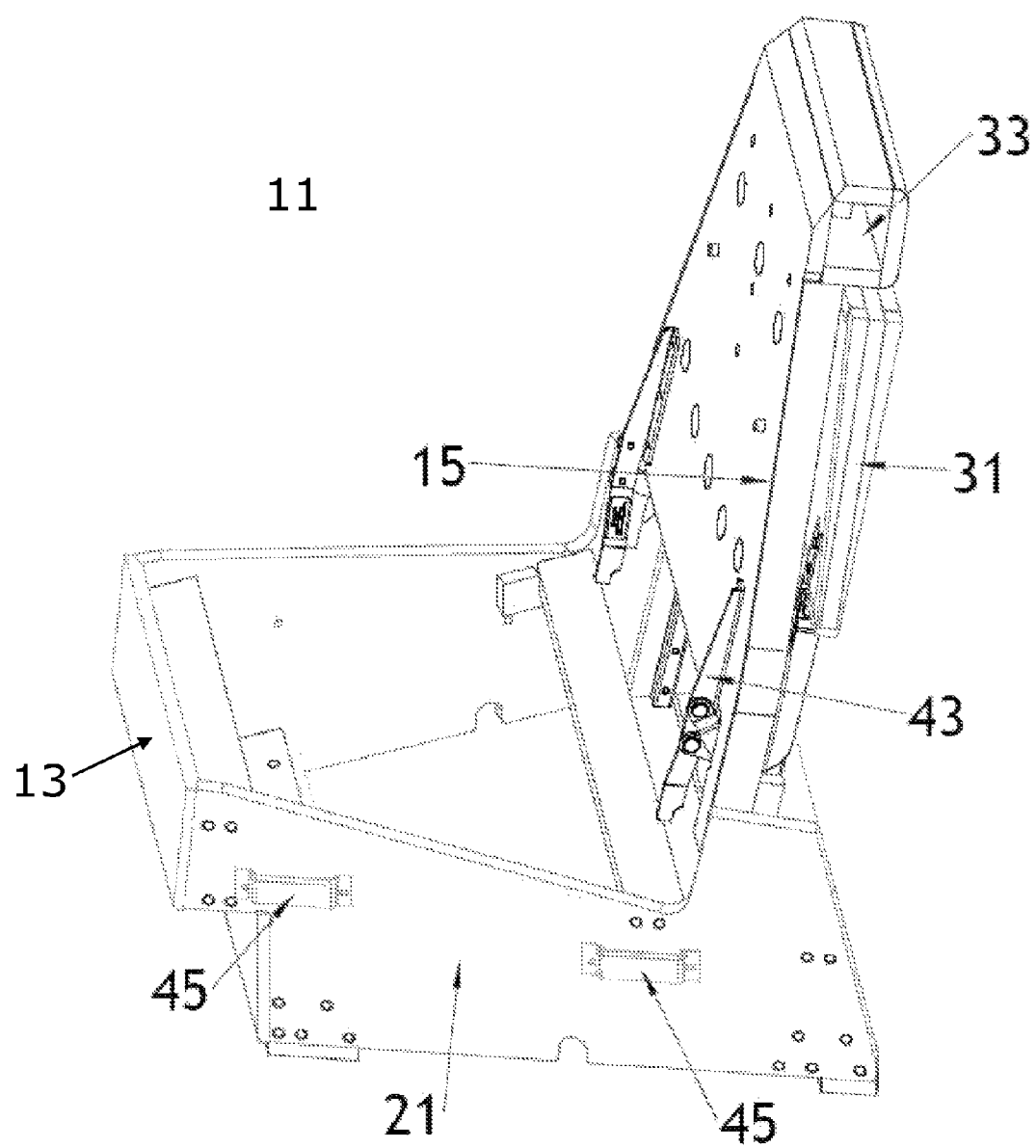
FIG. 3 shows a perspective view of an exemplary embodiment of an item of seating furniture according to the present invention in the sitting position.
Figure 4:
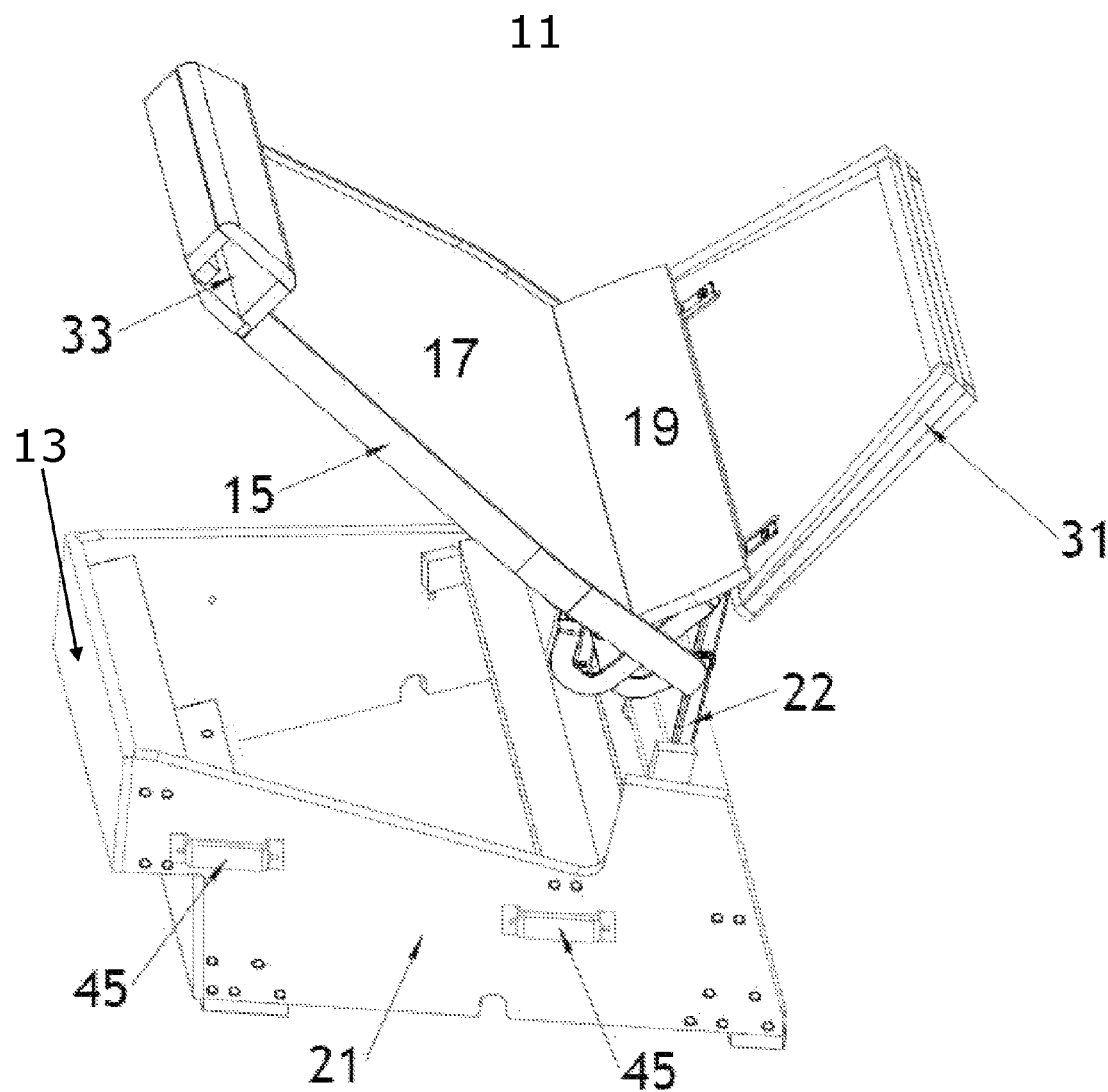
FIG. 4 shows a perspective view of an exemplary embodiment of an item of seating furniture according to the present invention in an intermediate position.

FIGS. 3 to 5 show an item of seating furniture according to the present invention which is realized as a three-seater sofa, the left-hand seating unit not being shown. Coupling elements 45, which serve to connect the left-hand seating unit (which is not shown), are provided on the left-hand side of the central seating unit 11 shown here, the back part 15 of which is adjustable in the manner according to the present invention. These types of coupling elements 45 are known in principle in order to connect bodies 21 of adjacent units together.

FIG. 3 shows the central seating unit 11 in the sitting position. The rear wall 31 is received in the recessed receiving space behind the back part 15 and below the head part 33 of the back part 15.

FIG. 4 shows an intermediate position when the back part 15 is being adjusted. The rear wall 31 is tilted rearward. The narrow second storage plate 19 no longer abuts flatly against the first storage plate 17 which is mounted on the rear side of the back part 15, i.e., the two storage plates 17, 19 are already unfolded or hinged apart from one another in part in the intermediate position. A retaining device (which is not shown in FIG. 4) provides that this occurs as has been described above, for example, in connection with FIGS. 1 and 2, and which can, for example, be provided as an elastic strap 23.

FIG. 5 shows the storage position in which the first storage plate 17 and the second storage plate 19 connect to one another in a flush manner and together form a level, continuous storage surface 47 which is oriented horizontally.

The storage surface 47 is closed off in the front region by the head part 33 and in the rear region by the rear wall 31 which is tilted rearward.

FIG. 5 also shows that the first storage plate 17 is realized in a substantially trapezoidal manner corresponding to the form of the back part 15, whereas the second storage plate 19 forms a comparatively narrow rectangle.

With regard to the components not shown in FIGS. 3 to 5 and to their functionality, reference is made to FIGS. 1 and 2 and to the above statements referring thereto.

The present invention is not limited to embodiments described herein; reference should be had to the appended claims.

LIST OF REFERENCES

11 Seating unit
13 Seat part
15 Back part
17 First storage plate
19 Second storage plate
21 Body
22 Carrier
23 Retaining device/Elastic strap
25 Pivot region
27 First articulated lever/Fitting
27a Rotational axis
27b Rotational axis
29 Second articulated lever/Fitting
29a Rotational axis
29b Rotational axis
31 Rear wall
33 Head part
41 Carrier plate
43 Carrier
45 Coupling element
47 Storage surface

What is claimed is:

1. An item of seating furniture comprising at least a first seating unit and a second seating unit arranged next to each other,
   the first seating unit comprising a first seating unit seat part and a first seating unit back part,
   the second seating unit comprising a second seating unit seat part, a second seating unit back part, an adjusting mechanism, and a second seating unit rear wall which is arranged behind the second seating unit back part, wherein,
   the second seating unit back part is configured to be forwardly adjustable relative to the second seating unit seat part between a sitting position and a storage position, the second seating unit back part comprising a rear side which is configured to form a storage surface, a first storage plate, and a second storage plate, the first storage plate and the second storage plate together forming the storage surface in the storage position,
   the adjusting mechanism is configured to move the first storage plate and the second storage plate relative to each other between the sitting position and the storage position, the adjusting mechanism being active when the second seating unit back part is adjusted, and
   when the second seating unit back part is forwardly adjusted relative to the second seating unit seat part from the sitting position into the storage position, the second seating unit rear wall is tilted rearwards relative to the second seating unit seat part.

2. The item of seating furniture as recited in claim 1, wherein, when the second seating unit back part is adjusted into the storage position, a region of the second seating unit back part that is at a bottom in the sitting position is raised.

3. The item of seating furniture as recited in claim 1, wherein,
the second seating unit further comprises a second seating unit base and a retaining device anchored to the second seating unit base,
wherein, an adjusting movement of the second storage plate is configured to be controlled via each of the second seating unit back part and the retaining device.

4. The item of seating furniture as recited in claim 3, wherein,
the second seating unit further comprises a second seating unit pivot region configured to move together with the second seating unit back part,
the second storage plate is configured to pivot about the second seating unit pivot region, and
the retaining device is configured to engage with the second storage plate a distance from the pivot region.

5. The item of seating furniture as recited in claim 3, wherein the retaining device is configured to be length-adjustable against a resetting force.

6. The item of seating furniture as recited in claim 3, wherein the retaining device includes at least one elastic band or at least one elastic strap.

7. The item of seating furniture as recited in claim 3, wherein the second seating unit further comprises a fitting, the fitting being configured to pivotally connect the second seating unit back part with the second seating unit base.

8. The item of seating furniture as recited in claim 7, wherein the fitting is a lift-fold fitting.

9. The item of seating furniture as recited in claim 7, wherein the fitting comprises a four-joint lever.

10. The item of seating furniture as recited in claim 7, wherein,
the fitting comprises a first articulated lever and a second articulated lever which are each angled and mounted so as to pivot on respective rotational axes of the second seating unit back part and on respective rotational axes of the second seating unit base, and
the rotational axes of the second seating unit back part and the rotational axes of the second seating unit base are spaced apart from one another.

11. The item of seating furniture as recited in claim 10, wherein, in the sitting position,
the rotational axes of the second seating unit back part are located in a first plane,
the rotational axes of the second seating unit base are located in a second plane, and
the first plane and the second plane are substantially parallel to each other.

12. The item of seating furniture as recited in claim 10, wherein, in the storage position,
the rotational axes of the second seating unit back part are located in a plane which extends at least substantially horizontally.

13. The item of seating furniture as recited in claim 1, wherein the second seating unit rear wall is configured to conceal the first storage plate and the second storage plate in the sitting position.

14. The item of seating furniture as recited in claim 1, wherein, in the storage position,
a gap exists between the first storage plate and the second seating unit rear wall, and
the gap is substantially closed or bridged by the second storage plate.

15. The item of seating furniture as recited in claim 1, wherein the second seating unit rear wall is configured to be adjustable between the sitting position and the storage position.

16. The item of seating furniture as recited in claim 3, wherein,
the second seating unit further comprises,
a fitting,
a second seating unit base, and
a second seating unit rear wall arranged behind the second seating unit back part,
the fitting is configured to pivotally connect the second seating unit back part to the second seating unit base, and
the fitting is configured to adjust the second seating unit back part so as to adjust the second seating unit rear wall.

17. The item of seating furniture as recited in claim 16, wherein the second seating unit back part and the second seating unit rear wall are forcibly coupled by the fitting.

18. The item of seating furniture as recited in claim 17, wherein,
the fitting comprises a fitting rotational axis, and
the second seating unit rear wall is configured to pivot about a fitting rotational axis so as to pivotally connect the second seating unit back part with the second seating unit base.

19. The item of seating furniture as recited in claim 18, wherein the fitting is an articulated lever.

* * * * *